United States Patent
Suga et al.

(10) Patent No.: US 9,554,010 B2
(45) Date of Patent: Jan. 24, 2017

(54) IMAGE READING APPARATUS AND REFLECTING MIRROR UNIT

(75) Inventors: Takayuki Suga, Toride (JP); Toshiki Kobayashi, Ryugasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 2050 days.

(21) Appl. No.: 11/756,142

(22) Filed: May 31, 2007

(65) Prior Publication Data

US 2007/0291333 A1   Dec. 20, 2007

(30) Foreign Application Priority Data

Jun. 15, 2006   (JP) ................ 2006-165728

(51) Int. Cl.
| | | |
|---|---|---|
| G02B 26/08 | (2006.01) | |
| H04N 1/024 | (2006.01) | |
| H04N 1/10 | (2006.01) | |
| H04N 1/193 | (2006.01) | |

(52) U.S. Cl.
CPC ............ H04N 1/024 (2013.01); *H04N 1/1017* (2013.01); *H04N 1/193* (2013.01); *H04N 2201/0241* (2013.01); *H04N 2201/0246* (2013.01); *H04N 2201/02412* (2013.01); *H04N 2201/02433* (2013.01); *H04N 2201/02445* (2013.01); *H04N 2201/02474* (2013.01); *H04N 2201/02483* (2013.01)

(58) Field of Classification Search
CPC ......................... G06K 7/10811; G06K 7/10881
USPC ...................................... 235/462.22; 358/509
See application file for complete search history.

(56) References Cited

U.S. PATENT DOCUMENTS

| | | | | |
|---|---|---|---|---|
| 4,732,440 A | * | 3/1988 | Gadhok | 359/214.1 |
| 4,833,544 A | | 5/1989 | Sato et al. | 358/287 |
| 5,075,538 A | * | 12/1991 | Swartz et al. | 235/462.36 |
| 6,467,345 B1 | * | 10/2002 | Neukermans et al. | 73/504.02 |
| 2004/0021913 A1 | | 2/2004 | Aoyama et al. | 358/474 |
| 2004/0066544 A1 | | 4/2004 | Suga et al. | 358/509 |
| 2006/0139700 A1 | | 6/2006 | Murakami et al. | 358/474 |
| 2006/0197997 A1 | | 9/2006 | Oshida et al. | 358/498 |
| 2006/0227389 A1 | | 10/2006 | Yamamoto et al. | 358/496 |
| 2007/0188825 A1 | | 8/2007 | Suga | 358/474 |

FOREIGN PATENT DOCUMENTS

| | | |
|---|---|---|
| JP | 3-113961 | 5/1991 |
| JP | 2004-126448 | 4/2004 |

OTHER PUBLICATIONS

U.S. Appl. No. 11/942,192, filed Nov. 19, 2007.

* cited by examiner

*Primary Examiner* — Rafferty Kelly
(74) *Attorney, Agent, or Firm* — Fitzpatrick, Cella, Harper & Scinto

(57) ABSTRACT

The invention relates to an image reading apparatus and includes: scanning unit including a light source; a focusing mirror which reflects light from the light source on a reflecting surface portion; and a mirror holder which fixes the focusing mirror on fixing portions formed at both ends of the mirror holder, wherein, when the scanning unit is moved to read image information, the focusing mirror is formed such that the fixing portion is smaller than the reflecting surface portion in at least one of strength and rigidity.

12 Claims, 11 Drawing Sheets

IMAGE READING APPARATUS AND REFLECTING MIRROR UNIT

BACKGROUND OF THE INVENTION

Field of the Invention

The present invention relates to an image reading apparatus in the field of an extensive image forming apparatus such as a copying machine, a facsimile apparatus, a printer, an image scanner, or a complex machine and a reflecting mirror unit used in the image reading apparatus.

Description of the Related Art

A conventional image reading apparatus which moves a scanning unit having a reflecting mirror formed thereon with respect to a focusing lens and a line sensor fixed at predetermined positions and exposes and scans an original surface to read an image is proposed by the present applicants (for example, see Japanese Patent Application Laid-Open No. 3-113961).

In recent years, on request of further miniaturization and simplification of an image reading apparatus, an image reading apparatus which constitutes a scanning unit which holds optical systems such as a reflecting mirror, a focusing element, a line sensor, and a light source together with each other as a compact unit and moves the scanning unit is practically used. As a device concerning to this, an image reading apparatus which constitutes an off-axial focusing unit to realize miniaturization is proposed (for example, see Japanese Patent Application Laid-Open No. 2004-126448). The off-axial focusing unit uses a plurality of mirrors as focusing elements, and the focusing mirrors are curved as off-axial reflecting surfaces having a direction opposing an incident direction of a reference axis beam to enable focusing.

However, the following several problems to be solved in common with conventional image reading apparatuses including the apparatuses disclosed in the Patent Documents are present.

As one of the problems, as in the image reading apparatus described in Japanese Patent Application Laid-Open No. 3-113961, in a structure for moving a scanning unit having a reflecting mirror, when a field angle is reduced to increase the resolution of a fixed focusing lens, the apparatus disadvantageously increases in size because an optical path length must be extended. From the opposite point of view, since a field angle must be increased to achieve miniaturization of the apparatus, the resolution at an end portion decreases, so that an amount of light decreases. In this manner, a high resolution of a lens and miniaturization of the apparatus are difficult to be compatibly satisfied.

Another problem, as in an image reading apparatus disclosed in Japanese Patent Application Laid-Open No. 2004-126448, a focusing mirror having an off-axial reflecting curved surface generally is made of a resin metal-molded and is not sufficient in rigidity or strength. For this reason, in order to fix a focusing mirror molded while keeping a mirror thickness constant by partially compressing the mirror or causing the mirror to adhere, stress acting on a pressing member or an adhering portion affects a mirror surface to deform the off-axial reflecting surface. As a result, focusing performance deteriorates.

SUMMARY OF THE INVENTION

The present invention provides an image reading apparatus in which, when a focusing mirror having an off-axial reflecting surface is used as a focusing element, the focusing mirror is suppressed from being deformed to obtain preferable focusing performance, and scanning unitization is further promoted to realize apparatus miniaturization.

In order to achieve the object, according to the present invention, there is provided an image reading apparatus in which a scanning unit having an optical system including a light source, a focusing mirror, and a mirror holder is moved to read image information, the focusing mirror reflects light from the light source by the reflecting surface portion and is fixed to the mirror holder by fixing portions formed on both ends of the reflecting surface portion. The focusing mirror is formed such that the fixing portion is smaller than the reflecting surface portion in strength or rigidity.

The reflecting mirror unit according to the present invention has a mirror having a light-reflecting surface formed thereon and a mirror holder for supporting the mirror. The mirror has a fixing portion to fix the mirror to the mirror holder and a reflecting surface portion having a reflecting surface formed thereon. The mirror is formed such that the fixing portion is smaller than the reflecting surface portion in strength or rigidity.

The image reading apparatus according to the present invention is structured such that image information is read by a scanning unit having an optical system such as a light source and a focusing mirror to enable apparatus miniaturization. At the same time, in the scanning unit, deformation occurring when the focusing mirror is fixed and held on the mirror holder is absorbed by fixing portions formed at both the ends and having strength or rigidity smaller than these of a reflecting surface portion. In this manner, since the focusing mirror is positioned on the mirror holder without deforming the reflecting surface portion, focusing performance can be effectively prevented from being deteriorated by the deformation of the reflecting surface portion.

DESCRIPTION OF THE EMBODIMENTS

Exemplary embodiments of an image reading apparatus according to the present invention will be described below with reference to the accompanying drawings.

Figure 1:
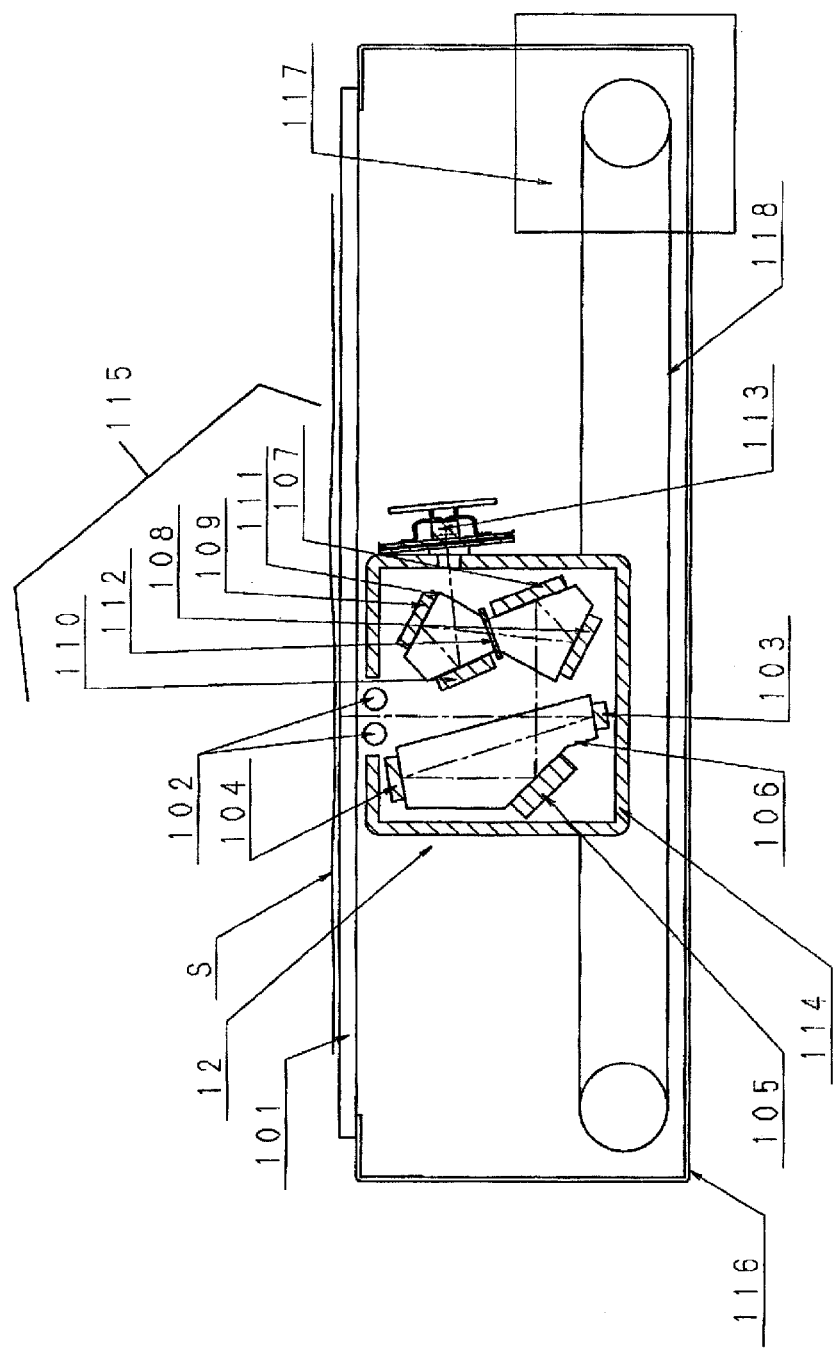
FIG. 1 is an overall diagram showing an embodiment of an image reading apparatus according to the present invention.

(Image Reading Apparatus) FIG. 1 schematically shows a structure of an image reading apparatus according to this embodiment. Plane mirrors 103 to 105 having an original table glass 101 on which an original S is placed and a light source 102 which irradiates light on the original S and, guiding light diffused from the surface of the original S, are held on a plane mirror holder 106. Focusing mirrors 107 to 110 each having an off-axial reflecting surface formed thereon are held on a focusing mirror holder 111. An aperture diaphragm 112 is arranged in the focusing mirror holder 111, and a CCD 113 which photoelectrically converts received light is arranged. A scanning frame 114 is arranged. In the scanning frame 114, the light source 102, the plane mirrors 103 to 105, the focusing mirror holder 111, and the aperture diaphragm 112 are held. An off-axial focusing unit 115 is constituted by the focusing mirrors 107 to 110, the focusing mirror holder 111, and the aperture diaphragm 112.

The original table glass 101 is supported by a reading unit frame 116, and a scanning frame 114 is held in the reading unit frame 116. The scanning frame 114 receives rotating force from a drive motor 117 through a drive belt 118 to enable to reciprocally move in the reading unit frame 116.

With the above configuration, when the original S placed on the original table glass 101 is to be read, the light source 102 is turned on, and the rotating force of the reading unit frame 116 is transmitted to the drive motor 117 to move the scanning frame 114 so as to scan the original S. Light from the light source 102 is irradiated on the original S and diffused on the original S. The diffused light is guided to the off-axial focusing portion 115 by the plane mirrors 103 to 105. In a process of sequentially reflecting the guided light by the focusing mirrors 107 to 110, an image is focused on the CCD 113 by the operation of the off-axial reflecting surfaces formed on the focusing mirrors 107 to 110. The CCD 113 photoelectrically converts the received light to electrically read an image on the original S.

Focusing Mirror Fixing Structure

First Embodiment

With respect to a focusing mirror fixing structure serving as a substance, the first embodiment will be described below with reference to FIG. 2 and subsequent diagrams.

Figure 2:
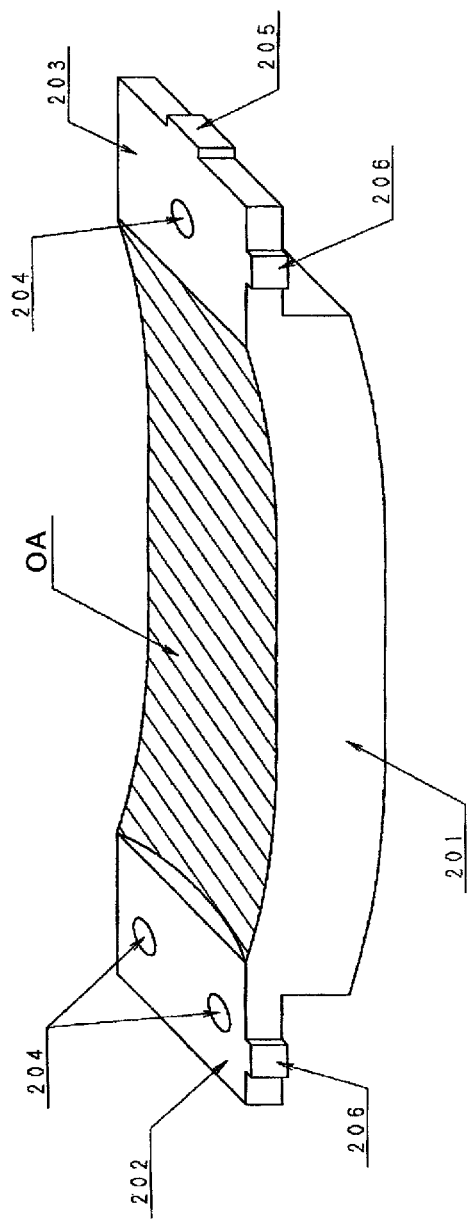
FIG. 2 is a perspective view singularly showing a focusing mirror according to the first embodiment.

FIG. 2 illustrates a focusing mirror typically added with reference numeral 201 with reference to the focusing mirrors 107 to 110. On the focusing mirror 201, an off-axial reflecting surface OA indicated by a hatched area is formed. Fixing portions 202 and 203 to position and fix the focusing mirror 201 are formed on both sides of the focusing mirror 201. Semi-spherical bump projecting portions 204 to position the focusing mirror 201 in a Z direction of coordinate axes are formed on the fixing portions 202 and 203. A bump projecting portion 205 to position the focusing mirror 201 in an X direction is formed, and a bump projecting portion 206 to position the focusing mirror 201 in a Y direction is formed. The fixing portions 202 and 203 are smaller in thickness than a portion on which the off-axial reflecting surface is formed. The fixing portions 202 and 203 have geometrical moments of inertia smaller than that of the off-axial reflecting surface OA by the thickness made smaller.

Figure 3:
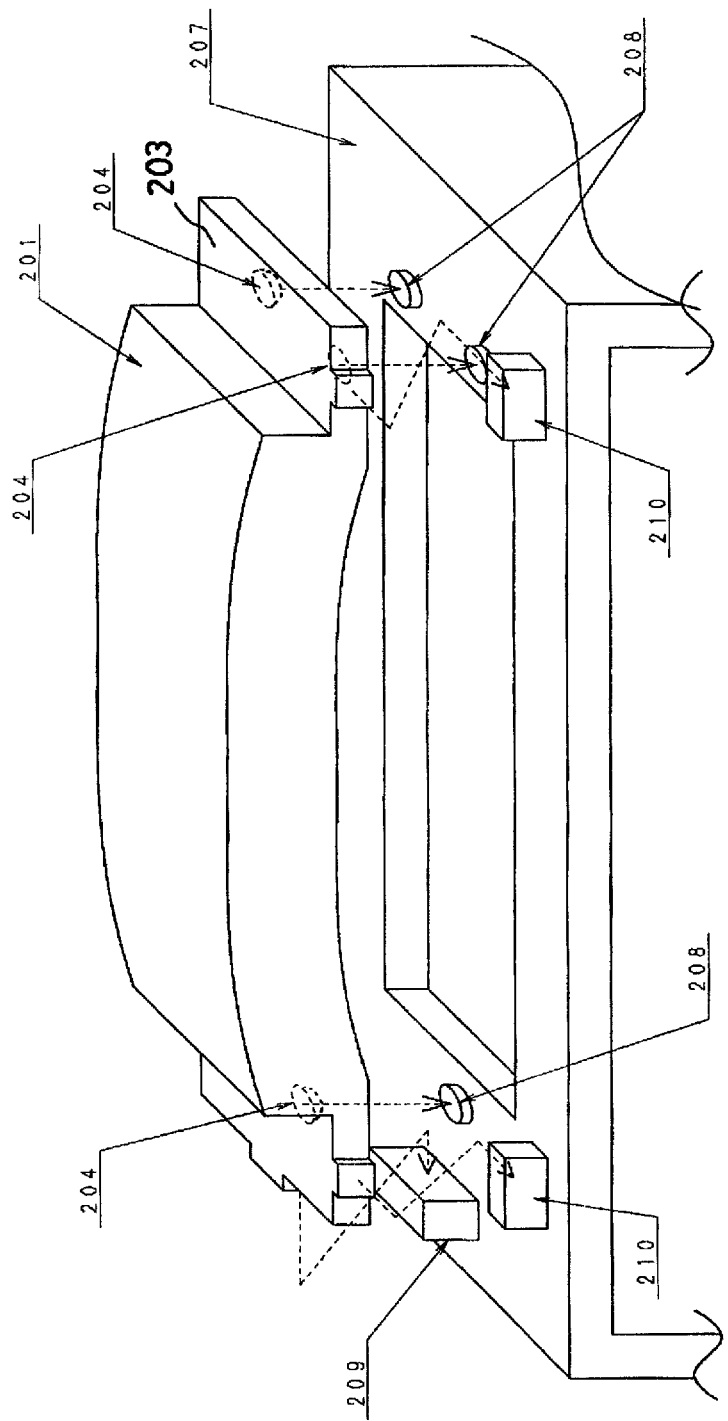
FIG. 3 is an exploded perspective view showing a connection structure which fixes the focusing mirror to a focusing mirror holder.

FIG. 3 illustrates connection between the focusing mirror 201 and a focusing mirror holder 207 which fixes and holds the focusing mirror 201. Three projecting portions 208 which engaged with the three bump projecting portions 204 formed on the focusing mirror 201 to position the focusing mirror 201 in a Z direction are formed on the focusing mirror holder 207. Receiving surfaces 209 and 210 to position the focusing mirror 201 in X and Y directions are formed on the focusing mirror holder 207. The three bump projecting portions 204 on the focusing mirror side are engaged with the three projecting portions 208 to position the focusing mirror 201 on the holder, so that a plane which supports the focusing mirror 201 in the Z direction is uniquely determined. The focusing mirror 201 is stably supported on the focusing mirror holder 207.

Figure 4:
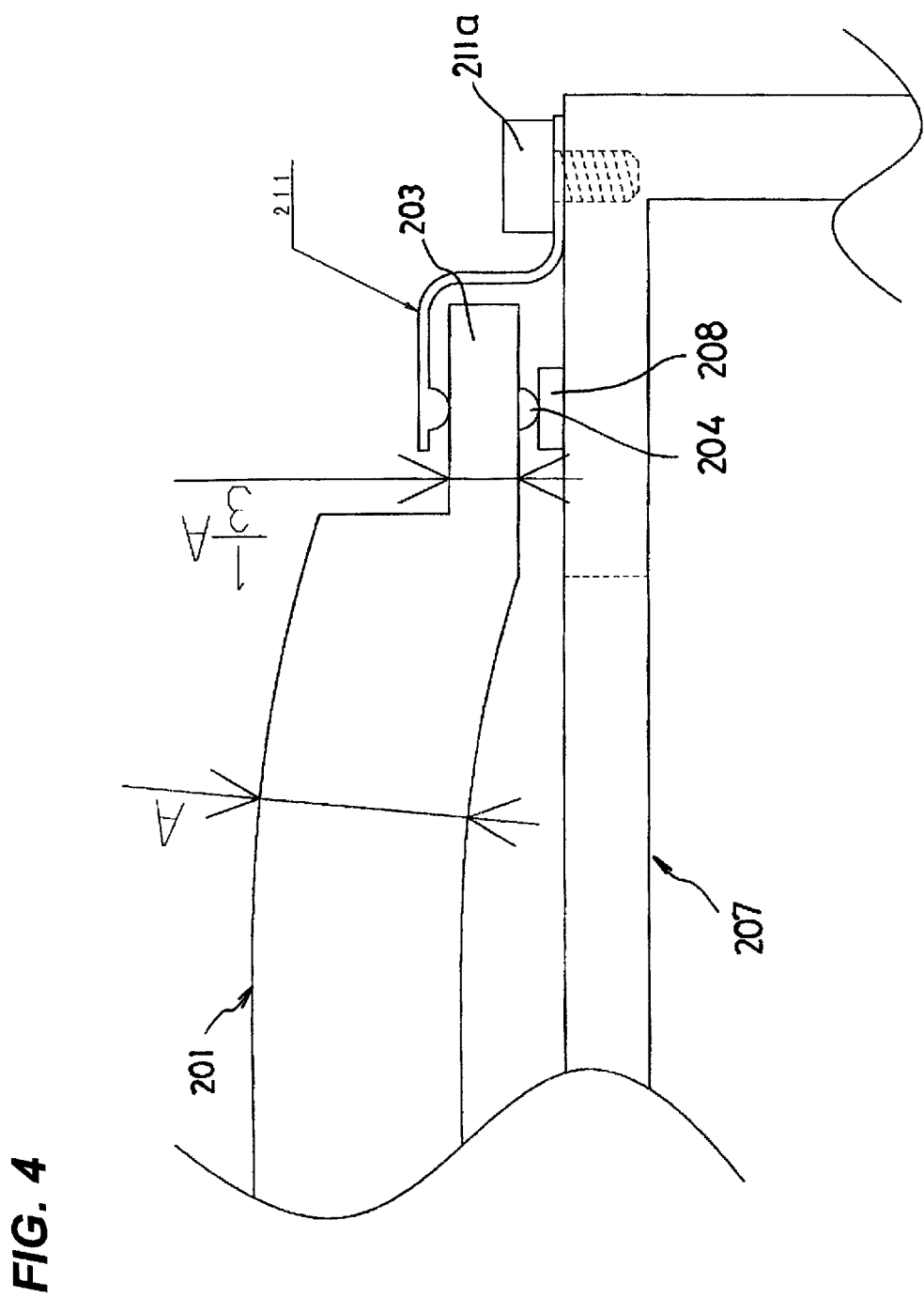
FIG. 4 is an assembling diagram of the focusing mirror and the holder according to the first embodiment.

As shown in FIG. 4, after the focusing mirror 201 is positioned on the focusing mirror holder 207 by striking in the X, Y, and Z directions of the coordinate axes, one end of the focusing mirror 201 is pressed from above by a pressing member 211 formed on the focusing mirror holder 207 to fix the focusing mirror 201. The pressing member 211 is formed to press the focusing mirror 201 at three positions with equal forces in response to the three bump projecting portions 204 which determine the focusing mirror 201 in the Z direction. The proximal end portion of the illustrated pressing member 211 is fixed by a fastening screw 211a. The pressing member 211 has such a shape that pressing force is generated at the other end, serving as a free end, by an elastic snap to press the focusing mirror 201.

When the focusing mirror 201 is held by pressing the fixing portions 202 and 203 by elastic pressing force of the pressing member 211, the focusing mirror 201 may be deformed. It is an essential point of the embodiment that the deformation is canceled.

More specifically, internal stress acts in the focusing mirror 201 by elastic pressing force generated by the pressing member 211. Due to an attaching error of the pressing member 211 or a molding error of the focusing mirror 201, bump pressed points of the bump projecting portions 204 and the pressing member 211 are not matched, and moments may be generated. The moment causes the focusing mirror 201 to be deformed. However, in the focusing mirror 201, the mirror thicknesses of the fixing portions 202 and 203 is molded smaller than a mirror thickness of the portion on which the off-axial reflecting surface is formed to decrease strength or rigidity, that is, to decrease a geometrical moment of inertia. In this manner, internal stress and a moment are absorbed by deformation of the fixing portions 202 and 203, so that deformation of the off-axial reflecting surface is eliminated or suppressed not to affect the function.

On the other hand, in an operation of the image reading apparatus, heat generated from the light source 102, the CCD 113, and the drive motor 117 is propagated through the air in the apparatus, so that the focusing mirror 201 may thermally expand. By the thermal expansion, the difference in linear thermal expansion coefficient between the focusing mirror 201 and the focusing mirror holder 207 generates stress to deform the focusing mirror 201. In this case, since the fixing portions 202 and 203 have low strength or low rigidity, the fixing portions 202 and 203 are deformed to absorb the internal stress and the moment. For this reason, deformation of the off-axial reflecting surface can be eliminated or suppressed to a small level.

If the fixing portions 202 and 203 are deformed to change the position of the off-axial reflecting surface, influence of a change in position of the off-axial reflecting surface on optical performance is about $1/10$ that of the deformation of the off-axial reflecting surface. In addition, since the positional change caused by the deformation of the fixing portions 202 and 203 is nothing or very small, deterioration of optical performance is almost nothing. The fixing portions 202 and 203 can be practically used without any problem.

In the focusing mirror 201 according to the embodiment, the thicknesses of the fixing portions 202 and 203 are set to be, for example, about ⅓ the thickness of the off-axial reflecting surface. Since the off-axial reflecting surface portion and the fixing portions 202 and 203 have nearly rectangular sectional shapes, respectively, an geometrical moment of inertia I can be calculated by in the following equation (1) using a width b and a thickness h of a member.

$$I = bh^3/12 \quad (1)$$

According to equation (1), geometrical moments of inertia of the fixing portions 202 and 203 having thicknesses which are ⅓ the thickness of the off-axial reflection surface portion are 1/27.

Figure 5:
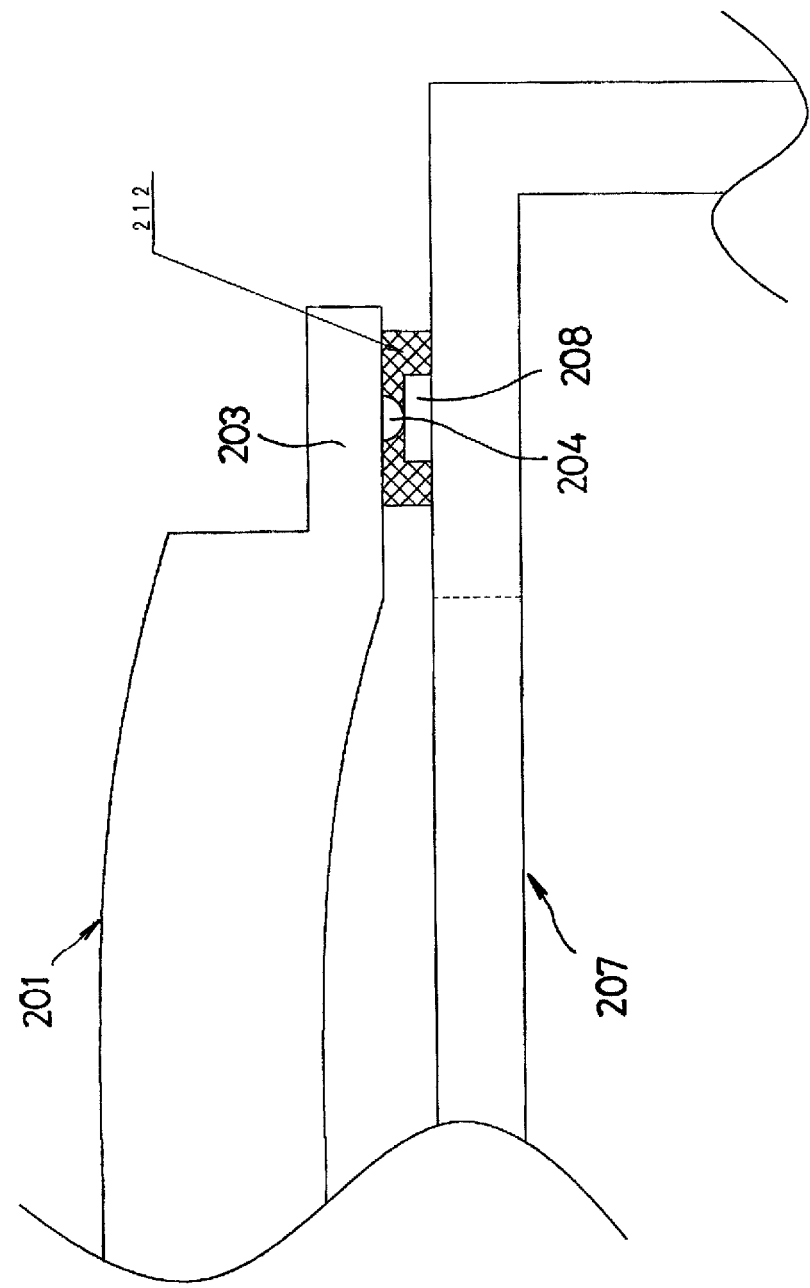
FIG. 5 is a diagram showing an assembling configuration of the focusing mirror and the holder according to the first embodiment.

FIG. 4 illustrates a configuration as if the fixing portions 202 and 203 of the focusing mirror 201 are fixed by being vertically pressed in the Z direction by the pressing member 211. This configuration is not necessarily used. When the pressing members 211 are arranged in the X and Y directions to press the fixing portions 202 and 203, the same operation and effect can be obtained. The fixing portion is not limited to the pressing member 211. As shown in FIG. 5, even though a focusing mirror 107 is fixed by using an adhesive agent 212, the same operation and effect can be obtained. When the focusing mirror 201 and the fixing portions 202 and 203 are fixed by the adhesive agent 212, as in the fixing by the pressing member 211, three positions are desirably equally and uniformly adhered in response to the three bump projecting portions 204 which determine the Z direction of the focusing mirror 201. In this case, the adhesive agent 212 contracts in hardening, and force acts in the direction so as to deform the focusing mirror 201. However, the fixing portions 202 and 203 are deformed to absorb internal stress and a geometrical moment of inertia I, and deformation of the off-axial reflecting surface can be eliminated and suppressed to a very small level.

In the illustrated structure, the focusing mirror 201 is positioned by bumping the focusing mirror 201 in the X, Y, and Z directions of the coordinate axes. However, the structure is not necessarily used. For example, when the focusing mirror 201 is positioned to the focusing mirror holder 207 by a positioning jig without bumps in both the Y and Y directions, the same operation and effect can be obtained by a technique which removes the jig after fixing by an adhesive agent.

Furthermore, the embodiment exemplifies that the geometrical moments of inertia of the fixing portions 202 and 203 are 1/27 that of the off-axial reflecting surface portion. This is only an example. For example, it is experimentally confirmed that the deformation of the off-axial reflecting surface can be advantageously decreased when the geometrical moment of inertia was ⅕ or less. As described above, when the fixing portions 202 and 203 have thicknesses smaller than that of the off-axial reflecting surface, a radio R of the thicknesses of the fixing portions 202 and 203 to the thickness of the off-axial reflecting surface portion can be calculated by the following equation (2).

$$R = \text{thickness of fixing portion/thickness of off-axial reflecting surface} \quad (2)$$

Therefore, when the value R calculated by the equation (2) is smaller than $1/\sqrt[3]{5}$, a geometrical moment of inertia becomes ⅕ or less, and the effect can be sufficiently obtained. However, although an advantage of decreasing the deformation of the off-axial reflecting surface increases when the geometrical moment of inertia is small. However, when the deformation of the fixing portions 202 and 203 increased, the positional change of the off-axial reflecting surface increases. In general, since the influence of the positional change of the off-axial reflecting surface on optical performance is about 1/10 that of deformation of the off-axial reflecting surface, the deformation of the off-axial reflecting surface is advantageously decreased to prevent the optical performance from being deteriorated. However, as shown in FIG. 1, depending on optical design of the off-axial focusing system obtained by combining the plurality of focusing mirrors 107, 108, 109, and 110, the focusing system may include a focusing mirror sensitive to the positional change. In such a case, a shape having a relatively large geometrical moment of inertia is advantageously applied to the mirror sensitive to the positional change, and a shape having a small geometrical moment of inertia is advantageously applied to the mirror sensitive to deformation of the off-axial reflecting surface.

In the illustrated structure, the off-axial reflecting surface is formed on the focusing mirror 201 fixed to the focusing mirror holder 207. However, when not only the off-axial reflecting surface, but also a focusing mirror on which a reflecting surface realized by a plane, a spherical surface, and a cylindrical surface is formed are used, the structure effectively suppresses deformation of the mirror surface portion.

Focusing Mirror Fixing Structure

Second Embodiment

Figure 6:
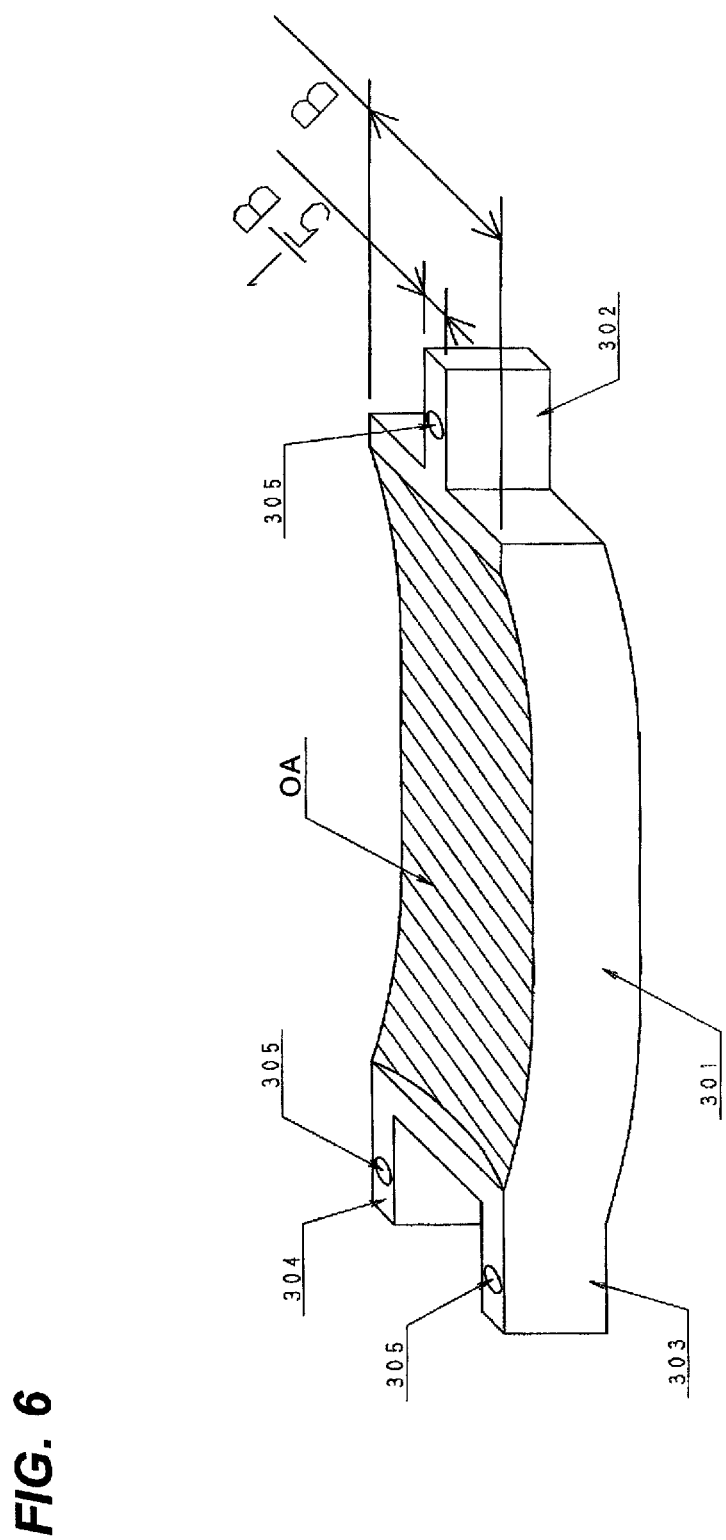
FIG. 6 is a perspective view showing a focusing mirror according to a second embodiment of the present invention.

FIG. 6 is a focusing mirror fixing structure according to a second embodiment.

In the first embodiment, the fixing portions 202 and 203 of the focusing mirror 201 are shaped to have thicknesses smaller than a thickness of the off-axial reflecting surface portion, so that geometrical moments of inertia of the fixing portions 202 and 203 are set to be molded smaller than that of the off-axial reflecting surface portion. In contrast to this, in the second embodiment, a width of a fixing portion of a focusing mirror is set to be small, so that a decrease in geometrical moment of inertia is targeted.

In this case, in a focusing mirror 301, an off-axial reflecting surface is formed in a hatched portion in FIG. 6, one fixing portion 302 is arranged on one end portion side, and two fixing portions 303 and 304 are arranged on the other end portion side. As a result, total three fixing portions are arranged. Furthermore, a semi-spherical bump projecting portion 305 to position the focusing mirror 301 in a Z direction is formed on each of the fixing portions 302, 303, and 304.

The fixing portions 302, 303, and 304 have projecting shapes projecting from a portion where the off-axial reflecting surface is formed and have small geometrical moments of inertia. In the embodiment, the widths of the fixing portions 302, 303, and 304 are set to be, for example, ⅕ the width of the portion where the off-axial reflecting surface is formed. In this manner, according to the above equation (1), the geometrical moment of inertia is calculated as ⅕.

A fixing structure to attach the focusing mirror 301 to a focusing mirror holder is the same as that in the first embodiment. Since internal stress or a moment generated when the focusing mirror 301 is fixing or stress caused by thermal expansion are absorbed by deformation of the fixing portions 302, 303, and 304, the deformation of the off-axial reflecting surface can be eliminated or suppressed to a small level, and optical performance can be effectively prevented from being deteriorated.

Figure 7:
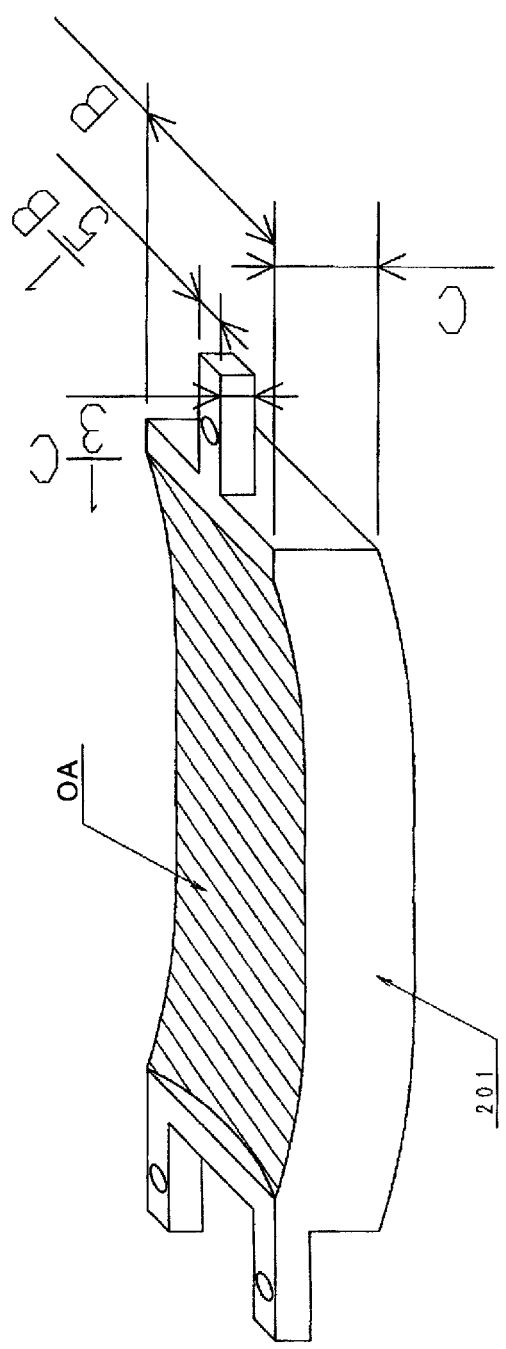
FIG. 7 is a perspective view showing an application of the focusing mirror according to the second embodiment.

As the structure of the mirror fixing portion, as shown in FIG. 7, a projecting shape projecting from the portion where the off-axial reflecting surface is formed and has a small thickness, so that a geometrical moment of inertia can be further decreased. In this case, since the mirror fixing portion has a width and a thickness which are ⅕ and ⅗ those of the off-axial reflecting surface, the geometrical moment of inertia calculated from the equation (1) becomes 1/135.

As described in the first embodiment, when the geometrical moment of inertia decreases, an effect of decreasing the deformation of the off-axial reflecting surface increases. However, when the deformation of the mirror fixing portion increases, the positional change of the off-axial reflecting surface increases. An influence of the positional change of the off-axial reflecting surface on optical performance is about 1/10 that of the deformation of the off-axial reflecting surface. For this reason, the decrease in deformation of the off-axial reflecting surface is effective to prevent the optical performance in general. However, as shown in FIG. 1, depending on optical design of an off-axial focusing system obtained by combining a plurality of focusing mirrors 107, 108, 109, and 110, the focusing system may include a focusing mirror sensitive to positional change. In such a case, a shape having a relatively large geometrical moment of inertia as shown in FIG. 6 is effectively applied to the mirror sensitive to the positional change, and a mirror as shown in FIG. 7 or 2 is effectively applied to the focusing mirror sensitive to the deformation of the off-axial reflecting surface.

As in the first embodiment, in the second embodiment, when, in addition to the off-axial reflecting surface formed on the focusing mirror 301, a plane, a spherical surface, and a cylindrical surface are formed as reflecting surfaces, the deformation of the mirror surface portion can be effectively decreased.

Focusing Mirror Fixing Structure

Third Embodiment

Figure 8A:
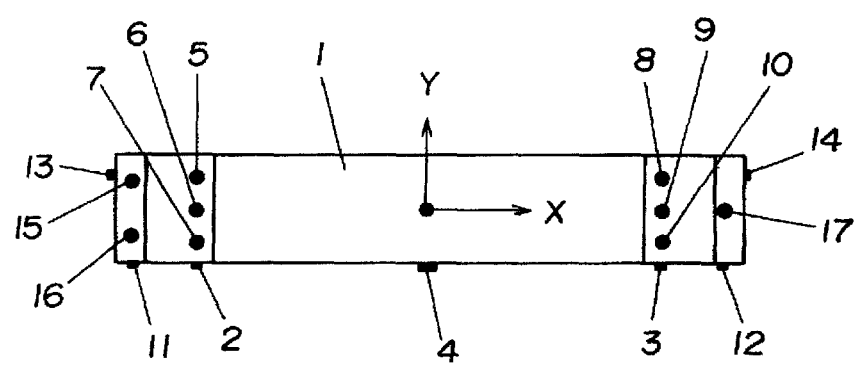
FIGS. 8A and 8B are a plan view and a side view showing a focusing mirror according to the third embodiment of the present invention.
Figure 8B:
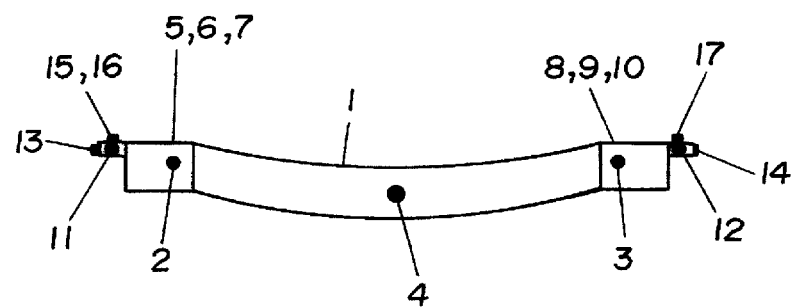

FIGS. 8A and 8B illustrate a shape of a plastic mirror element as a concrete example of a focusing mirror fixing structure according to a third embodiment.

The plastic mirror element according to the embodiment has an optical function surface 1 at a thick high-rigidity portion, reference measuring portions 2 and 3 which regulate a Y direction, a reference measuring portion 4 which regulates an X direction, and reference measuring portions 5, 6, 7, 8, 9, and 10 which regulate an X-Y plane. Furthermore, the plastic mirror element has, at a thin low-rigidity portion, product attaching reference portions 11 and 12 which regulate a Y direction, product attaching reference portions 13 and 14 which regulate an X direction, and product attaching reference portions 15, 16, and 17 which regulate an X-Y plane.

When the plastic mirror element is molded, with respect to a plastic mirror element obtained by various molding operations, an optical function surface shape is measured by a three-dimensional measuring device based on the reference measuring portions 2 and 3 which regulate the Y direction, the reference measuring portion 4 which regulates the X direction, and the reference measuring portions 5 to 10 which regulate the X-Y plane. In this manner, an optical function surface measurement result in a measurement reference coordinate system can be obtained. In this case, in measurement of the optical function surface shape, when the plastic mirror element is held and fixed to a measuring jig by the product attaching reference of the thin low-rigidity portion, the optical function surface and the various measurement reference portions are not deformed by holding because the optical function surface and the various measurement reference portions are thick and highly rigid as described above. For this reason, accurate optical function surface measurement can be performed without deforming the optical function surface. When the measurement result is used in correction for a mold optical function surface, a plastic mirror element having an accurate optical function surface can be manufactured.

Subsequently, the reference measuring portions 2 and 3 which regulate the Y direction and the reference measuring portion 4 which regulates the X direction are measured by a three-dimensional measuring device. Furthermore, positional relations between the reference measuring portions 5 to 10 which regulate the X-Y plane, the product attaching reference portions 11 and 12 which regulate the Y direction, the product attaching reference portions 13 and 14 which regulate the X direction, and the product attaching reference portions 15 to 17 which regulate the X-Y plane are measured. A mold reference shape constituting each product attaching reference portion is constituted by a flow tub which can be adjusted in height. For this reason, when the flow tub is adjusted, a product attaching reference coordinate system regulated by the product attaching references can be matched to a measurement reference coordinate system regulated by the measurement references. More specifically, the optical function surface position can be determined in a product built-in state.

In this case, some of the measurement references set on the thick high-rigidity portion are also used as positioning references when the mirror element is built in without being held and fixed to the main body, the product attaching reference portions set on the thin low-rigid portion are not required to be able to regulate the three axial directions. As the measurement references set on the thick high-rigidity portion, any measurement reference which can regulate the measurement reference coordinate system can be used. Shapes of the references, the number of references, and arrangement of the references are not limited. As the product attaching references set on the thin high-rigidity portion, any references which can regulate one or more axial directions can be used. Shapes of the references, the number of references, and arrangement of the references are not limited.

Focusing Mirror Fixing Structure

Fourth Embodiment

Figure 9A:
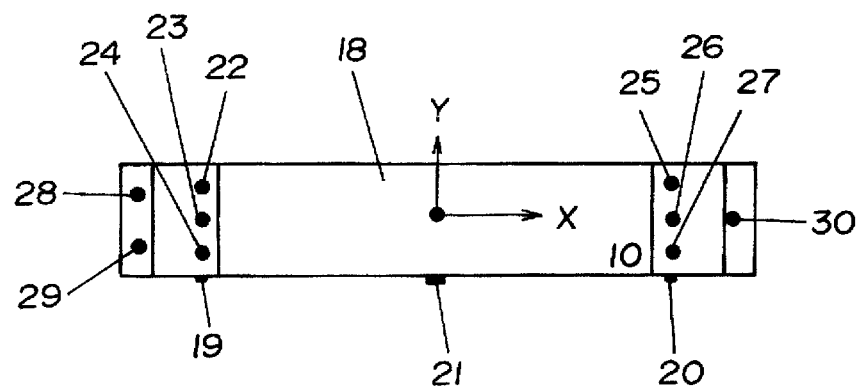
FIGS. 9A and 9B are a plan view and a side view showing a focusing mirror according to a fourth embodiment of the present invention.
Figure 9B:
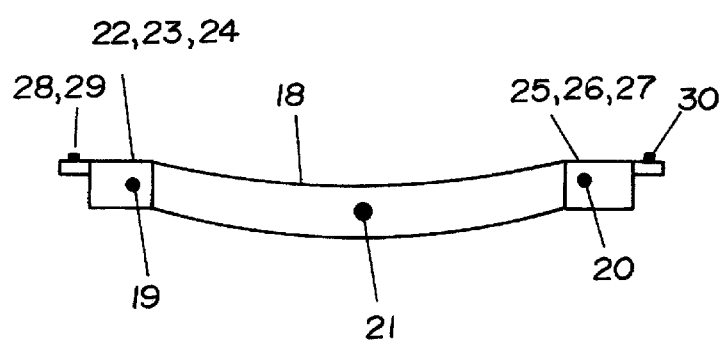

FIGS. 9A and 9B illustrate a shape of a plastic mirror element as a concrete example of a focusing mirror fixing structure according to a fourth embodiment. In the third embodiment, the formation and molding of the mirror having the measurement references which regulates three axial directions and product attaching reference portions which regulate three axial directions are illustrated. Therefore, in the fourth embodiment, a plastic mirror having a measurement reference which regulate three axial directions and a product attaching reference which regulates one axial direction is illustrated. This plastic mirror element has an optical function surface 18 at a thick high-rigidity portion and has reference measuring portions 19 and 20 which regulate a Y direction, a reference measuring portion 21 which regulates an X direction, and reference measuring portions 22 to 27 which regulate an X-Y plane. Furthermore, the plastic mirror element has product attaching measuring portions 28 to 30 which regulate an X-Y plane at a thin low-rigidity portion. The reference measuring portions 19 and 20 which regulate the Y direction and the reference measuring portion 21 which regulates the X direction are also used as positioning references when the mirror element is built without being held and fixed to the main body.

Therefore, when the plastic mirror element is molded, with respect to a plastic mirror element obtained by various molding operations, the reference measuring portions 19 and 20 which regulate the Y direction are measured by the three-dimensional measuring device. Furthermore, an optical function surface shape is measured by using a three-dimensional measuring device based on the reference measuring portion 21 which regulates the X direction and the reference measuring portions 22 to 27 which regulate the X-Y plane. In this manner, an optical function surface measurement result in a measurement reference coordinate system can be obtained. In this case, in measurement of the optical function surface shape, when the plastic mirror element is held and fixed to a measuring jig by the product attaching reference of the thin low-rigidity portion, the optical function surface and the various measurement reference portions are not deformed by holding because the optical function surface and the various measurement reference portions are thick and highly rigid as described above. For this reason, accurate optical function surface measurement can be performed without deforming the optical function surface. When the measurement result is used in correction for a mold optical function surface, a plastic mirror element having an accurate optical function surface can be manufactured.

The reference measuring portions 19 and 20 which regulate the Y direction is measured by using a three-dimensional measuring device, the reference measuring portion 21 which regulates the X direction, reference measuring portions 22 to 27 which regulate the X-Y plane, and the reference measuring portions 19 and 20 which regulate a Y' direction when the mirror element is built in are measured. Furthermore, positional relations between the reference measuring portion 21 which regulates an X' direction when the mirror element is built in and the product attaching measuring portions 28, 29, and 30 which regulate an X'-Y' plane are measured. A mold reference shape constituting each product attaching reference shape is constituted by a flow tub which can be adjusted in height. For this reason, when the flow tub is adjusted, a product attaching reference coordinate system regulated by the product attaching references and positioning reference when the mirror element is built in can be matched to a measurement reference coordinate system regulated by the measurement references. More specifically, the optical function surface position can be determined in a product built-in state.

Several embodiments of the present invention have been described above. However, the present invention is not limited to the embodiments. Other embodiments, applications, modifications, and combinations thereof can be effected without departing from the spirit and scope of the present invention.

This application claims the benefit of prior Japanese Application No. 2006-165728 filed on Jun. 15, 2006 the entire contents of which are incorporated by reference herein.

What is claimed is:

1. An image reading apparatus comprising:
a light source which illuminates a reading position,
a photoelectrical converting unit which converts received light into electricity,
a mirror holder,
a focusing mirror which focuses and reflects light reflected from an original at the reading position, wherein the focusing mirror has a reflecting portion having a curved reflecting surface and a pair of fixing portions which are respectively disposed at both ends of the focusing mirror in a longitudinal direction, wherein a first surface of each of the fixing portions, facing the mirror holder, has a projection, and
a pair of pressing members each of which abuts to a second surface of a respective one of the fixing portions other than the first surface and each of which presses the focusing mirror toward the mirror holder, for fixing the focusing mirror on the mirror holder,
wherein a geometrical moment of inertia of the fixing portions is smaller than a geometrical moment of inertia of the reflecting portion.

2. The image reading apparatus according to claim 1, wherein the reflecting portion and the fixing portions are integrally molded by the same material.

3. The image reading apparatus according to claim 2, wherein the geometrical moment of inertia of the fixing portions of the focusing mirror is not more than ⅕ of the geometrical moment of inertia of the reflecting portion of the focusing mirror.

4. The image reading apparatus according to claim 1, wherein thickness of the fixing portions of the focusing mirror is not more than $\frac{1}{3}\sqrt{5}$ of thickness of the reflecting portion of the focusing mirror.

5. The image reading apparatus according to claim 1, wherein width of the fixing portions of the focusing mirror is not more than ⅕ of width of the reflecting portion of the focusing mirror.

6. The image reading apparatus according to claim 1, wherein the focusing mirror is positioned on the mirror holder by the fixing portions of the focusing mirror.

7. The image reading apparatus according to claim 6, wherein the focusing mirror is positioned on the mirror holder by the fixing portions of the focusing mirror in a direction of thickness.

8. The image reading apparatus according to claim 6, wherein the focusing mirror is positioned on the mirror holder by the fixing portions of the focusing mirror in a direction of thickness of the focusing mirror and a direction perpendicular to the direction of thickness.

9. The image reading apparatus according to claim 6, wherein the focusing mirror is joined to the mirror holder on the fixing portions of the focusing mirror by an adhesive agent.

10. The image reading apparatus according to claim 1, wherein the curved reflecting surface of the focusing mirror is an off-axial reflecting surface having an incident direction and an emission direction of a reference axis beam, the incident direction and the emission direction being different from each other.

11. The image reading apparatus according to claim 1, wherein the pressing members have projections on surfaces facing to the fixing portions of the focusing mirror and the projections of the pressing portions abut to the second surfaces.

12. The image reading apparatus according to claim 1, wherein one of the fixing portions of the focusing mirror has single projection and the other one of the fixing portions has two projections.

* * * * *